United States Patent [19]
Hilton et al.

[11] Patent Number: 5,415,673
[45] Date of Patent: May 16, 1995

[54] ENERGY EFFICIENT FILTRATION OF SYNGAS COOLING AND SCRUBBING WATER

[75] Inventors: Joanne L. Hilton; Frederick B. Seuffert, both of Houston, Tex.; Erwin A. Reich, Stamford, Conn.

[73] Assignee: Texaco Inc., White Plains, N.Y.

[21] Appl. No.: 136,149

[22] Filed: Oct. 15, 1993

[51] Int. Cl.[6] .................................................. C10J 3/46
[52] U.S. Cl. .................................. 48/197 R; 48/206; 48/215; 252/373
[58] Field of Search ............ 48/197 R, 202, 203, 48/206, 209, 215, 197 A; 202/373; 45/190, 196, 197, 172, 174

[56] References Cited

U.S. PATENT DOCUMENTS

| | | | |
|---|---|---|---|
| 2,987,386 | 6/1961 | Chapman et al. | 48/215 |
| 3,016,981 | 1/1962 | Fritz | 95/196 |
| 3,607,157 | 9/1971 | Schlinger | 48/197 R |
| 3,660,046 | 5/1972 | Smith | 48/216 |
| 3,929,429 | 12/1975 | Crouch | 48/216 |
| 4,014,786 | 3/1977 | Potter et al. | 48/197 R |
| 4,074,981 | 2/1978 | Slater | 48/197 R |
| 4,328,008 | 5/1982 | Muenger et al. | 48/197 R |
| 4,465,496 | 8/1984 | Suggitt | 48/197 R |
| 4,474,584 | 10/1984 | Koog | 95/195 |
| 4,704,137 | 11/1987 | Richter | 48/216 |
| 5,251,433 | 10/1993 | Wallace | 48/197 R |

*Primary Examiner*—Peter Kratz
*Attorney, Agent, or Firm*—George J. Darsa; Kenneth R. Priem; Jeffrey M. Greenman

[57] ABSTRACT

A partial oxidation process for the production of a stream of cooled and cleaned synthesis gas, reducing gas, or fuel gas substantially free from entrained particulate matter and slag. The hot raw gas stream from the partial oxidation gas generator is quench cooled with deaerated grey water in a quench tank to produce black quench water or cooled in a radiant and/or convection cooler. The cooled gas is scrubbed with deaerated grey water in a scrubbing zone to remove all of the entrained particulate matter and to produce black scrubbing waters. The black water is resolved in a flashing zone and reused by flashing it in two or three flash stages connected in series and separating the overhead flash vapors comprising vaporized grey water and sour gas from the bottoms comprising concentrated black water. The flash vapors from the first flash stage are used to heat a stream of deaerated grey water being recycled to the quench tank and gas scrubbing zone or to the gas scrubbing zone. The concentrated black water from the flashing zone is thickened in a clarifier and then filtered to produce filter cake which may be burned and grey water filtrate. The flash vapors from the second flash stage and optionally steam are introduced into a deaerator to strip dissolved oxygen from incoming make-up water, grey water condensate, and grey water filtrate. In another embodiment of the process, the flash zone comprises three flash stages.

9 Claims, 1 Drawing Sheet

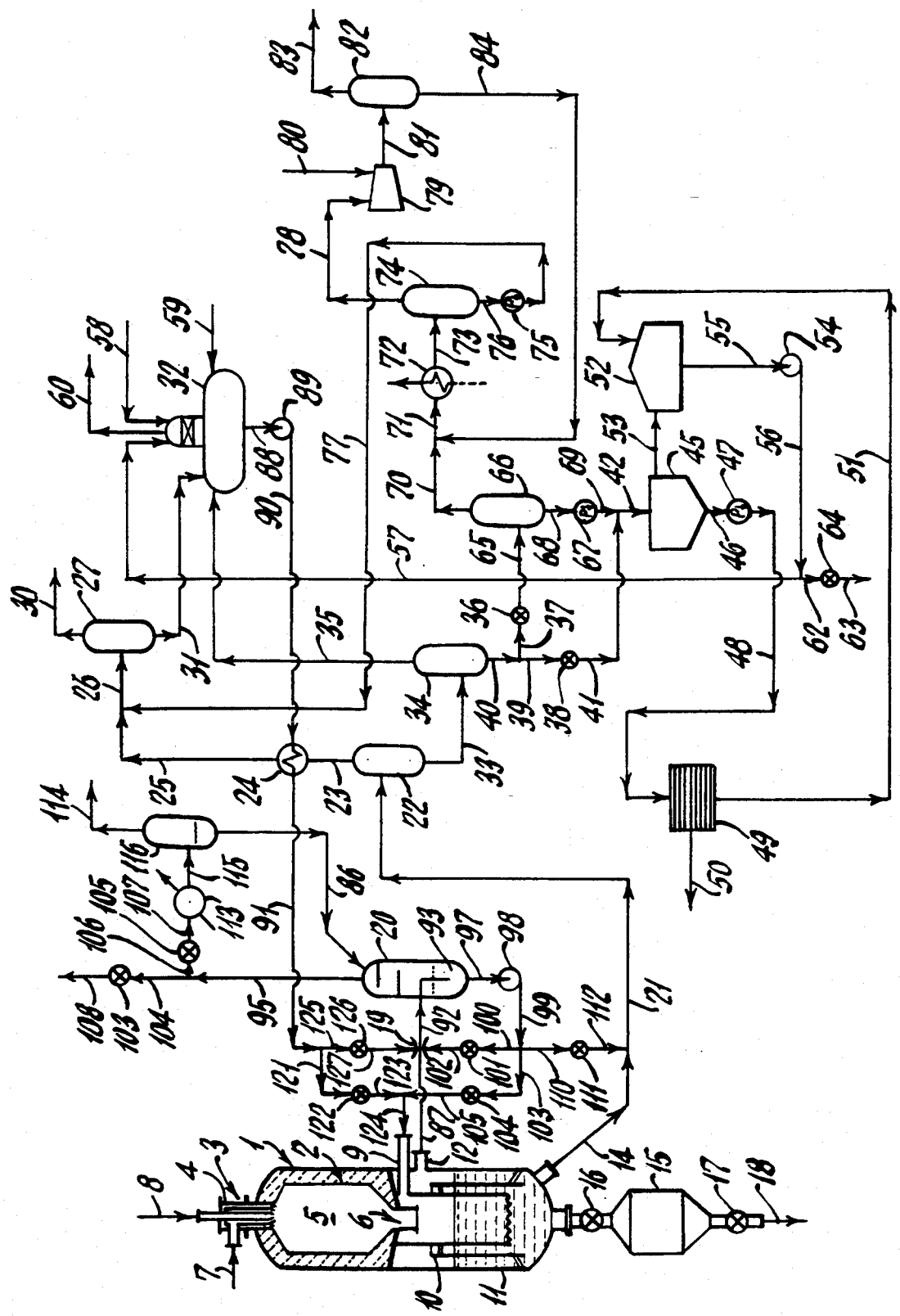

ENERGY EFFICIENT FILTRATION OF SYNGAS COOLING AND SCRUBBING WATER

BACKGROUND OF THE INVENTION

FIELD OF THE INVENTION

This invention relates to the production of cooled and cleaned gaseous mixtures comprising $H_2$, CO, $CO_2$ and $H_2O$ by the partial oxidation of liquid hydrocarbonaceous fuels or aqueous slurries of solid carbonaceous fuels. More particularly, it pertains to a process for cooling and cleaning synthesis gas with water to remove entrained particulate matter and includes flashing, deaerating, and energy efficient filtration of the gas cooling and scrubbing waters.

The partial oxidation process is a well known process for converting liquid hydrocarbonaceous fuels into synthesis gas, reducing gas and fuel gas. See coassigned U.S. Pat. Nos. 3,988,609. 4,251,228; 4,436,500; 4,468,376 and 4,704,137 for example, which are incorporated herein by reference. The raw effluent gas stream leaves the reaction zone at a temperature in the range of about 1100° C. to 1540° C. and comprises $H_2$, CO, $CO_2$ and $H_2O$ along with minor amounts of other gases. Also included in the gas stream is entrained particulate matter in an amount in the range of about 1.5 to 500 /m$^3$. In order to prevent contamination and/or plugging of beds of catalyst located downstream or to prevent plugging of burner nozzles, it is necessary to clean the raw gas stream by contacting it with water. Quench cooling the hot raw gas stream in water contained in a quench tank is shown and described in coassigned U.S. Pat. No. 4,801,347, which is incorporated herein by reference. Scrubbing the hot raw gas stream by means of a scrubbing nozzle or orifice scrubber is shown and described in coassigned U.S. Pat. Nos. 3,524,630 and 3,749,377, which are incorporated herein by reference. The solids concentration in the water used in gas quenching and scrubbing is in the range of about 0.1 to 6.0 wt. %. This water is called black water. It is pumpable and normally contains about 2.0 wt. % of particulate carbon. Removal of particulate carbon from the black water is commonly done by solvent extraction in a one or two-stage decanter, such as shown and described in coassigned U.S. Pat. No. 4,014,786. The carbon extraction system is complex and has a high capital cost due to its large number of equipment items, cost of solvent, as well as high energy cost. Steam consumption is high and heat exchange efficiency due to frequent fouling of the black water/grey water exchangers is poor. Thus, the most commonly used but costly solvent carbon extraction system is eliminated by the subject process. This arrangement eliminates the need for extraction naphtha and its associated high energy consumption.

The subject process removes the particulate matter and a portion of the sour gases from the gas cooling and scrubbing water stream in an energy efficient manner that also maximizes the quality and amount of deaearated grey water that is produced and returned to the raw gas quenching and scrubbing sections.

SUMMARY

The subject process relates to a partial oxidation process for the production of a stream of cooled and cleaned gas substantially free from particulate matter for use as synthesis gas, reducing gas, or fuel gas comprising:

(1) reacting by partial oxidation a liquid hydrocarbonaceous fuel or an aqueous slurry of solid carbonaceous fuel with a free-oxygen containing gas in the presence of a temperature moderator to produce a hot raw gas stream comprising $H_2$, CO, $CO_2$, $H_2O$, entrained particulate matter comprising particulate carbon and ash; and at least one material from the group $N_2$, Ar, $H_2S$, COS, $CH_4$, $NH_3$, HCN, HCOOH, and slag;

(2) cooling the hot raw gas stream from (1) by (a) direct contact with quench water in a gas quenching zone thereby producing a pumpable stream of black quench water, or by (b) indirect heat exchange with water in a gas cooling zone; whereby any slag and a portion of the entrained particulate matter from said raw gas stream are removed;

(3) scrubbing in a gas scrubbing zone the cooled hot raw gas stream from (2) with deaerated gray water produced subsequently in the process to remove substantially all of the remaining entrained particulate matter in said raw gas stream, and producing black scrubbing water;

(4) introducing said black water from (2)(a) and (3) into a flash zone wherein the pressure is dropped by flashing thereby producing flash vapor comprising vaporized grey water and sour gas; and a separate bottoms stream of flashed black water whose solids content is greater than the solids content of said black scrubbing water in (3);

(5) passing a first portion of said flash vapor from (4) through a heat exchange zone in indirect heat exchange with a stream of deaerated grey water, thereby simultaneously heating said deaerated gray water and condensing grey water from the cooled flash vapor, and separating sour gas from said condensed grey water;

(6) introducing a second portion of said flash vapor from (4) and said condensed grey water from (5) into a deaerating zone, deaerating said condensed grey water, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b);

(7) clarifying the flashed black water from (4) in a clarifying zone to produce grey water and a bottoms stream of concentrated black water;

(8) filtering the stream of concentrated black water from (7) to produce filter cake and grey water filtrate; and (9) deaerating the grey water filtrate produced in (7) and (8) in said deaerating zone, and recycling by way of said heat exchange zone in (5) at least a portion of the deaerated grey water to said gas quenching zone in (2)(a) and the gas scrubbing zone in (3) for the gas quenching mode in (2)(a) or to the gas scrubbing zone in (3) for the gas cooling mode in (2)(b).

BRIEF DESCRIPTION OF THE DRAWING

A more complete understanding of the invention may be had by reference to the accompanying drawing which illustrates a preferred embodiment of the invention. It is not intended to limit the subject invention to the particular process or materials described.

DESCRIPTION OF THE INVENTION

In the subject process, a raw gas stream, substantially comprising $H_2$, $CO$, $CO_2$, $H_2O$, entrained particulate matter comprising particulate carbon and ash; and at least one material from the group $N_2$, Ar, $H_2$, COS, $CH_4$, $NH_3$, HCN, HCOOH, and slag is produced by partial oxidation of a liquid hydrocarbonaceous fuel or an aqueous slurry of solid carbonaceous fuel with a free-oxygen containing gas, typically in the presence of a temperature moderator, in the reaction zone of an unpacked, vertical, free-flow noncatalytic partial oxidation gas generator. When steam is used as the temperature moderator the steam-to-fuel weight ratio in the reaction zone is in the range of about 0.1 to 5, and preferably about 0.2 to 0.7. The atomic ratio of free oxygen to carbon in the fuel (O/C ratio), is in the range of about 0.6 to 1.6, and preferably about 0.8 to 1.4. The reaction time is in the range of about 0.1 to 50 seconds, such as about 2 to 6 seconds.

The synthesis gas generator comprises a vertical cylindrically shaped steel pressure vessel lined with refractory, such as shown in coassigned U.S. Pat. No. 2,809,104, which is incorporated herein by reference. A typical quench drum is also shown in said patent. A burner, such as shown in coassigned U.S. Pat. No. 2,928,460, which is incorporated herein by reference may be used to introduce the feed streams into the reaction zone.

A wide range of combustible liquid hydrocarbonaceous fuels or aqueous slurries of solid carbonaceous fuel may be reacted in the gas generator with a free-oxygen containing gas, in the presence of a temperature moderating gas, to produce the synthesis gas.

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks to the gasifier, is intended to include various materials, such as liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The liquid hydrocarbonaceous feed may be at room temperature, or it may be preheated to a temperature up to as high as about 340° C. to 650° C. but preferably below its cracking temperature. The liquid hydrocarbonaceous feed may be introduced into the gas-generator burner in liquid phase or in a vaporized mixture with the temperature moderator.

The need for a temperature moderator to control the temperature in the reaction zone of the gas generator depends in general on the carbon-to-hydrogen ratios of the feedstock and the oxygen content of the oxidant stream. A temperature moderator is used with liquid hydrocarbon fuels with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include $CO_2$-rich gas, nitrogen, and recycled synthesis gas.

The term free-oxygen containing gas as used herein means air, oxygen-enriched air i.e. greater than 21 mole % $O_2$, and substantially pure oxygen, i.e. greater than about 95% mole oxygen (the remainder usually comprising $N_2$ and rare gases). Free-oxygen containing gas may be introduced by way of the partial-oxidation burner at a temperature in the range of about ambient to 260° C.

The raw gas stream exits from the reaction zone at a temperature in the range of about 925° C. to 1926° C., and preferably 1100° C. to 1540° C., and at a pressure in the range of about 5 to 300 atmospheres, and preferably 15 to 150 atmospheres. The composition of the hot-raw effluent gas stream is about as follows, in mole percent: $H_2$ 10 to 70, CO 15 to 57, $CO_2$ 0.1 to 25, $H_2O$ 0.1 to 20, $CH_4$ nil to 60, $NH_3$ nil to 5, $H_2S$ nil to 5, COS nil to 0.1, $N_2$ nil to 60, Ar nil to 2.0, HCN and HCOOH nil to 100 parts per million (weight basis). Particulate carbon is present in the range of about 0.2 to 20 weight % (basis carbon content in the original feed). Ash and/or molten slag may be present respectively in the amounts of about 0.5 to 5.0 and nil to 60 weight % of the original liquid hydrocarbonaceous or solid carbonaceous fuel feed. Depending on the composition after removal of the entrained particulate carbon and any ash and/or slag in the manner described below and with or without dewatering, the gas stream may be employed as synthesis gas, reducing gas, or fuel gas.

In a preferred embodiment of the subject process all of the hot raw effluent gas stream leaving the refractory lined reaction zone of the partial oxidation gas generator at substantially the same temperature and pressure as in the reaction zone, less ordinary drop in the lines is directly introduced into a pool of water contained in the bottom of a quench drum or tank such as the one described in coassigned U.S. Pat. No. 2,896,927 which is herewith incorporated by reference.

The quench drum is located below the reaction zone of the gas generator, and the stream of raw gas which it receives carries with it substantially all of the ash and/or slag and the particulate carbon soot leaving the reaction zone of the gas generator. The turbulent condition in the quench drum, caused by large volumes of gases bubbling up through the water helps the water to scrub substantially all of the solids from the effluent gas.

Large quantities of steam are generated within the quench vessel and saturate the gas stream. The stream of raw gas is cooled in the quench drum and leaves at a temperature in the range of about 150° C. to 315° C. Advantageously, the fresh quench water used in the subject invention is deaerated grey water or condensate produced subsequently in the process. This water is substantially free from dissolved oxygen. Dissolved oxygen in circulating water causes significant corrosion of vessels and piping. Dissolved oxygen also plays a role in chloride stress corrosion cracking. The expression "and/or" is used herein in its ordinary way. For example, A and/or B-means either A or B or A+B.

In another embodiment of the subject process, the hot gas stream from the gas generator is passed through a radiant and/or convective cooler where the gas stream may be cooled to a temperature in the range of about 250° C. to 600° C. Suitable gas coolers are shown and described in coassigned U.S. Pat. Nos. 3,709,669; 3,868,817; 4,436,530; 4,377,132; and 4,328,008 which are incorporated herein by reference.

In order to prevent the plugging of downstream catalyst beds and/or the contaminating of liquid-solvent absorbents that may be used in subsequent gas purification steps, the cooled and cleaned gas stream leaving the quench drum or the cooled gas leaving the radiant and/or convective cooler is further cleaned by contact with a scrubbing fluid in another gas cleaning zone. This gas cleaning zone may include a conventional orifice such as shown and described in coassigned U.S. Pat. No. 3,524,630 which is incorporated herein by reference and conventional venturi scrubbers and sprays, along with a gas scrubbing chamber such as shown and described in coassigned U.S. Pat. No. 3,232,727, which is incorporated herein by reference. In the gas scrubbing chamber, the stream of raw gas is scrubbed with hot return condensate and deaerated grey water as described herein. For example, the gas stream leaving the quench tank associated with the gasifier is scrubbed and intimately contacted with scrubbing fluid e.g. deaerated grey water in a venturi scrubber. Next, the mixture of gas and scrubbing water passes into and up through a pool of gas scrubbing water contained in the bottom of a gas scrubbing chamber. The scrubbed gas is then passed up through a packed section or trays in the upper portion of the scrubbing chamber where it is contacted by condensate flowing in a downward direction. Scrubbing water in the bottom of the gas scrubbing chamber is recycled to the venturi scrubber and/or the quench tank associated with the gasifier. Optionally to maintain solids concentration, a portion of the scrubbing water may be mixed with the black water leaving from the bottom of the quench tank.

The deaerated grey scrub water contains less than about 100 parts per million (wt) (ppmw) solids. It is derived herein by removing particulate solids from the black water, such as found in the quench tank connected to the gasifier. The clean saturated gas stream leaving the gas scrubbing chamber at a temperature in the range of about 150° C. to 315° C. is cooled to a temperature below the dew point and introduced into a gas-liquid separation vessel. Condensate is removed from the bottom of the separation vessel and returned to the gas scrubbing chamber as the gas scrubbing agent. Clean raw synthesis gas is removed from the top of the separation vessel. If necessary, the raw synthesis gas may be sent to a conventional gas purification facility e.g. Rectisol unit to remove any objectionable impurities e.g. sulfur-containing gas. The clean purified syngas may be used for the catalytic synthesis of organic chemicals e.g. alcohol. By the gas cleaning procedure used in the subject process, the amount of solid particles in the gas stream may be reduced to less than about 3 parts per million (ppm), and preferably less than about 1 ppm. Alternatively, the gas stream leaving the gas scrubbing chamber may be saturated with $H_2O$ and may be introduced directly into a gas turbine as fuel gas when it is desired to reduce the $NO_x$ content of the exhaust gas. Alternatively, this cooled cleaned product gas saturated with $H_2O$ may be introduced directly into a conventional catalytic water-gas shift converter to increase the $H_2/CO$ mole rate of the stream of synthesis gas or to produce $H_2$-rich gas.

A pumpable aqueous dispersion is produced in the quench tank substantially comprising quench water and about 0.1 to 4.0 wt. such as about 0.5 to 2.5 wt. % of particulate carbon containing solids. This carbon-water dispersion is referred to herein as "black water". Depending on the composition of the fuel, a relatively small amount of ash may be present in the dispersion. Further, any unburned inorganic solids such as coarse ash and/or slag from solid fuels and any refractory from the gasifier may accumulate at the bottom of the quench tank. Periodically, this material may be removed by way of a lock-hopper. A stream of carbon-water dispersion is separated from the ash and/or slag.

The dispersion of carbon-water called "black-water" is resolved by the steps of flashing, settling, and filtering in a carbon-recovery zone to be further described. In this manner, the carbon may be recovered and recycled to the gas generator as a portion of the fuel, and the water, called deaerated "grey water", may be recycled to the gas quenching and scrubbing zones.

The particulate carbon in the black water that is introduced into the carbon-recovery zone is in the form of free-carbon black or soot. The Oil Absorption No. of the carbon soot, as determined by ASTM Method D-281, is greater than 1 and usually varies from 2 to 4 cc of oil per gram of C. The inorganic ash from the oil in these dispersions comprises metals and the sulfides. For example, for petroleum derived fuels these components may be selected from the group Ca, Ni, V, and Fe, and mixtures thereof. Further, for such fuels the amount of water soluble impurities in the black water comprises in parts per million (ppm): ammonia 0 to 10,000; formate 0 to 10,000; sodium chloride 0 to 5,000; nickel 0 to 25; iron 0 to 150; sulfide 0 to 500; and cyanide 0 to 100.

The stream of black water leaving from the bottom of the quench tank, optionally in admixture with a stream of scrubbing water leaving a secondary gas scrubbing zone to be described further, is processed in the following manner to produce deaerated grey water and solid particulate carbon. All of the black water at a temperature in the range of about 150° C. to 315° C. and a pressure in the range of about 1500 to 18,000 kPa is introduced into a flash zone which comprises a high pressure flash drum (HPFD) in series with a medium pressure flash drum (MPFD). In another embodiment, a third flash drum called a vacuum flash drum (VFD), is in series with the MPFD. By this means step-wise multi-step flashing and concentration of the black water may be effected. Advantages of step-wise flashing are as follows:

The step-wise flashing allows for the cooling of the black water without direct heat exchange of the dirty black water with the grey water. Heat is recovered by condensation of the relatively clean high pressure flash vapor against the deaerated grey water. By dropping the pressure in the HPFD to an intermediate pressure rather than to atmospheric pressure, the flashed gases are produced at a higher temperature for indirect heat exchange with the deaerated grey water. The grey water may be thereby heated to a higher temperature. Additional lower level heat is recovered by indirect heat exchange by contacting the cold grey water with the medium pressure flash vapor in the deaerator.

In the high pressure flash drum (HPFD) the inlet pressure in the range of about 1500 to 18,000 kPa is suddenly released and drops to a value in the range of about 300 to 2000 kPa. The temperature of the black water falls to about 137° C. to 215° C. About 28 to 13 weight percent (wt. %) of the black water is vaporized to form vaporized grey water along with about 0.05 to 0.5 wt. % of the water soluble gaseous impurities e.g. a gas selected from the group consisting of $CO_2$, $NH_3$, CO, $H_2S$, HCN, COS, HCOOH, and mixtures thereof, called sour gas. The stream of vaporized grey water and sour gas from the HPFD is passed in non-contact indirect heat exchange with a stream of deaerated liquid grey water leaving from the bottom of a deaerator at a temperature in the range of about 100° C. to 150° C. The deaerated grey water is thereby heated to a temperature in the range of about 120° C. to 185° C. The heated deaerated grey water is then introduced into the synthesis gas generator quench tank as the gas quench cooling medium, and into the gas scrubbing zone as the scrubbing medium. For example, about 1 to 50 wt. % of the deaerated grey water is introduced into the quench tank and the remainder is introduced into a venturi scrubber. A portion e.g. about 30 to 90 wt. % of the vaporized grey water is condensed and separated from the sour gas. The sour gas is sent to a conventional gas treating facility. The condensed grey water is sent to a deaerator. When a radiant and/or convective cooler is used to cool the hot raw synthesis gas, then all of the deaerated grey water is introduced into the gas scrubbing zone e.g. venturi scrubber.

The bottoms stream of black water leaves the HPFD having a solids concentration in the range of about 0.6 to 5.0 wt. % and is introduced into a medium pressure flash drum (MPFD) where the inlet pressure in the range of about 300 to 2,000 kPa is suddenly dropped to an outlet pressure in the range of about 100 to 1950 kPa. About 27 to 6 wt. % of the black water in the medium pressure flash drum is thereby vaporized and leave overhead at a temperature in the range of about 100° C. to 138° C. The concentrated pumpable black water leaving from the bottom of MPFD has a temperature in the range of about 100° C. to 138° C. and a solids concentration in the range of about 1.5 to 5.5 wt. %. This stream is introduced into a conventional clarifier. The main purpose of the clarifier is to ensure that the overflow water (grey water) has low suspended solids e.g. less than about 100 ppm (wt.) solids. The clarifier also provides surge capacity for the liquids-solids removal unit e.g. filter. Thus, the clarifier bottoms pump sends the soot-water stream to a filter at a temperature in the range of about 43° C. to 138° C. The overflow water stream from the clarifier flows into a grey water storage tank. The grey water is routed to the deaerator for eventual return to the gasification section. In most cases, sufficient grey water leaves the system with the filter cake to control the dissolved chlorides at acceptable levels. Additional grey water may be blown down from the grey water tank to control the dissolved species if necessary.

Flash vapors from the top of the MPFD comprising vaporized grey water and sour gas are introduced into the deaerator. The flash vapors from the MPFD and optionally supplemental steam are the principal means for stripping oxygen, and sour gases from the circulating grey water streams and make-up water streams which are introduced into the deaerator. Sour gas and water vapor are removed from the top of the deaerator and sent to conventional gas treating facility.

In one embodiment, the concentrated pumpable bottoms stream of black water from the MPFD is introduced into a vacuum flash drum (VFD). The VFD is used to control the temperature of the black water without direct heat exchange in the range of 40° C. to 100° C. when necessary to protect the filters. During operation, the inlet pressure in the range of about 100 to 1950 kPa is suddenly dropped in the VFD to an outlet pressure in the range of about 95 to 5.0 kPa. The concentrated pumpable bottoms stream of black water from the VFD at a temperature in the range of about 100° C. to 40° C. and a solids content in the range of about 2 to 6 wt. are introduced into the clarifier.

About 0.5 to 9 wt. % of the black water that is introduced into the VFD is vaporized and leaves overhead at a temperature in the range of about 100° C. to 40° C. The VFD overhead vapor is cooled to a temperature below the dew point and separated into grey water and sour gas at a temperature in the range of about 60° C. to 30° C. The grey water is introduced into the deaerator directly or by way of a gas-liquid separator. The sour gas is removed by a conventional vacuum pump, separated from the pump discharge stream, and sent to a conventional gas purification facility. The separated condensed water from the pump is recycled and combined with the overhead vapors from the vacuum flash drum.

The pumpable bottom stream from the clarifier comprising black water having a particulate carbon solids content in the range of about 2.0 to 25 wt. % and a temperature in the range of about 100° C. to 40° C. is resolved in a conventional liquid-solids separator such as a filter, hydroclone, or centrifuge. For example, by means of a filter press, filter cake having a solids content of 10 to 60 wt. % may be produced along with grey water filtrate. The filter cake may be burned as fuel or alternately used to recover the metals content. The filtrate may be stored in a grey water tank along with the overflow stream from the clarifier. A stream of grey water is pumped from the grey water storage tank to the deaerator. A stream of make-up water and a separate stream of steam are also introduced into the deaerator.

By means of the deaerator oxygen is removed from the grey water. The temperature of the grey water leaving the deaerator is in the range of about 100° C. to 150° C. By means of the deaerator, the grey water is rendered substantially free from dissolved oxygen. Prior to recycling to the gasifier quench tank and the gas scrubber the deaerated grey water is heated to a temperature in the range of about 120° C. to 185° C. by indirect heat exchange with the flash vapors from the HPFD. Advantageously, by deaerating the grey water, dissolved oxygen is eliminated from the circulating water systems thereby reducing the need for premium metallurgy. Further, low level heat may be recovered thereby improving overall energy efficiency. The deaerator operates by introducing flash vapors from the MPFD and optionally steam into the deaerator and thereby stripping dissolved oxygen from the incoming makeup water, grey water condensate, and recycle filtrate.

A summary of the advantages of the subject process follows:

Heat exchangers in the solids containing water service are eliminated.

Oxygen is prevented from entering the gasification water systems by sending all oxygenated water streams to the deaerator.

The heat in the high pressure water streams is used to accomplish deaeration and to reheat the grey water.

By incorporating the deaerator, the amount of grey water reuse is maximized and a large blowdown stream is eliminated.

The number of pieces of equipment and the capital cost of the unit are minimized.

A filter cake material suitable for feed to a coal-fired steam boiler or for metals reclamation is produced.

The conventional decanter system with its need for extraction solvent and its associated high energy consumption are eliminated.

Lower quality makeup water, such as sour water, shift condensate and/or ammonia condensate, may be used.

DESCRIPTION OF THE DRAWING

Referring now to FIG. 1, an unobstructed free flow noncatalytic down-flowing partial oxidation gas generator 1 is depicted as being lined with a refractory material 2, and having an axially aligned inlet port 3, an annulus type burner 4, an unpacked reaction zone 5, and an outlet port 6 leading into a quench chamber 11. A carbonaceous fuel, preferably a liquid petroleum product or a ground, solid carbonaceous material suspended in a liquid such as water, is pumped through inlet 7 of annulus burner 4. An oxidant, comprising a free-oxygen containing gas is also admitted into annulus burner 4 through inlet 8. A temperature moderator such as water or steam, is introduced through either or both inlets of annulus burner 4 in admixture with the material passing therethrough.

A useful gas generator 1 is described in coassigned U.S. Pat. No. 2,809,104 issued to D. M. Strasser et al which is incorporated herein by reference. A useful annulus type burner 4 is more fully described in coassigned U.S. Pat. No. 2,928,460 issued to Du Bois Eastman et al which is incorporated herein by references. Burners having other designs may also be used in the process shown in FIG. 1.

The annulus type burner 4 mixes an oxidant with the carbonaceous fuel and, optionally a temperature moderator. The mixture reacts within the reaction zone 5. The various quantities of carbonaceous fuel, oxidant and moderator are carefully controlled so that substantially all of the carbonaceous fuel is converted to gas, and so that the desired temperature range is maintained within the reaction zone 5. The raw synthesis gas exits the reaction zone 5 through bottom axial outlet port 6 and discharges into quench chamber 11 which is partially filled with water. Water is introduced into quench chamber 11 through line 9 and into a dip tube-draft tube combination 10 where the water contacts and quenches the hot, raw synthesis gas. A portion of the water is removed from quench chamber 11 by way of bottom line 14. When the hot raw synthesis gas exiting from generator 1 is mixed with water in the dip tube-draft tube 10 in quench vessel 11, some of the water is turned into steam. The synthesis gas is thereby saturated. Any molten slag present, for example, when an ash containing fuel such as is coal is used as fuel, solidifies and can be removed periodically from quench chamber 11 through water sealed lock-hopper 15 which is equipped with isolation valves 16 and 17 and exit line 18. Fine ash and particulate carbon including incompletely gasified carbonaceous fuel particles are suspended in the water within the quench chamber 11 and are withdrawn with the water through line 14 at a temperature in the range of about 150° C. to 315° C. The aqueous suspension in line 14, called black water contains particulates and at least one water soluble gaseous impurity from the group consisting of $CO_2$, $NH_3$, CO, $H_2S$, HCN, COS, HCOOH, and mixtures thereof, and referred to herein as sour gas.

Trace amounts of formic acid may be made by the reactions $CO + H_2O$ and when the hot raw synthesis gas is quench cooled in quench chamber 11 and/or scrubbed with water in a gas scrubbing zone comprising venturi scrubber 19 and scrubbing vessel 20. A portion of the $H_2O$ and water soluble gaseous impurities in the black water in line 21 are removed from the water suspension by suddenly reducing its pressure and flashing it in a flash zone comprising two pressure flash drums 22 and 34, or alternatively in a flash zone comprising pressure flash drums 22 and 34 and vacuum flash drum 66.

The steam and sour gas separated from the black water in flash drum 22 are passed through line 23 and cooled in heat exchanger 24 to a temperature below the dew point. A mixture of aqueous condensate and sour gas is passed through line 25 and 26 and collected in knockout pot 27. The cooled sour gases are withdrawn from the system through line 30 for treatment in a conventional gas purification unit (not shown) to remove objectionable components, prior to discharge. The condensate from knock-out pot 27 is passed through line 31 into deaerator 32.

The liquid bottoms stream from high pressure flash drum 22 is passed through line 33 into medium flash drum 34 where the pressure is suddenly dropped. The flash vapors passes through line 35 into deaerator 32. With valve 36 in line 37 closed and valve 38 in line 39 open, the liquid bottoms stream from medium pressure flash drum 34 is passed through lines 40, 39, valve 38, and lines 41, 42 and into clarifier 45. Thickened black water leaves through line 46 at the bottom of clarifier 45. By means of pump 47 the thickened black water is pumped through line 48 into a conventional liquid-solids separation means 49, for example, a filter press. Filter cake leaves through line 50 and may be used as fuel. Grey water filtrate is passed through line 51 and into grey water storage tank 52. The overflow from clarifier 45 is passed through line 53 into storage tank 52. By means of pump 54, grey water is pumped through lines 55, 56 and 57 into deaerator 32.

A small portion, typically from about 1 to 15 percent of the clarified grey water, may be periodically withdrawn from the system and sent to a conventional waste water treatment unit (not shown). The water is passed through line 62, valve 64, and line 63 as a waste water stream to maintain the concentration of dissolved solids in the circulating water at an acceptable level from the standpoint of minimizing corrosion and operating problems in the water system that can be caused by soluble materials. For example, halide salts are the major materials of concern. The size of the waste water stream depends on the amount of the soluble materials in the feed to the gasifier. This water must be further treated in processing units not shown, for removal of constituents of environmental concern before it is discarded. Make-up water and optionally steam for stripping are introduced into deaerator 32 by way of lines 58 and 59 respectively. Steam and free-oxygen containing gas leave deaerator 32 by way of line 60.

In another embodiment, with valve 38 in line 39 closed and valve 36 in line 37 open, the concentrated flashed black water in line 40 is passed through line 37, valve 36, and line 65 into vacuum flash drum 66 where additional flashing and concentrating of the black water takes place. By means of pump 67, concentrated black water is pumped through lines 68, 69 and 42 into clarifier 45. The overhead vapors from vacuum flash drum 66 are passed through lines 70 and 71, cooled below the dew point in cooler 72 and passed through line 73 into gas-liquid separator 74. By means of pump 75, grey water in line 76 is pumped through line 77 and mixed in line 26 with the gas-liquid stream from line 25. The uncondensed gases in overhead line 78 of gas/liquid separator 74 are introduced into vacuum pump 79. Seal water enters pump 79 through line 80. In one embodiment not shown, a portion of the grey water in line 77 is used as a portion of the seal water in line 80 for vacuum pump 79. Vacuum pump discharge is passed through line 81 into gas-liquid separator 82. Sour gas leaves through upper line 83 and is sent to a conventional gas purification treatment unit (not shown). Condensate from separator 82 is passed through line 84 and is recycled and mixed in line 71 with the overhead stream 70 from vacuum flash drum 66.

Synthesis gas containing a portion of the fine ash and carbon particles exits quench chamber 11 through outlet 12 and line 87 at a temperature in the range of about 150° C. to 315° C. The quenched synthesis gas stream in line 87 is passed through a conventional venturi type scrubber 19, wherein the synthesis gas stream is scrubbed for removal of residual particles by deaerated grey water and scrubber bottoms water. For example, by means of pump 89 deaerated grey water from deaerator 32 may be passed through lines 88, 90, heater 24, line 91 into quench tank 11 and venturi scrubber 19 by way of lines 121, valve 122, lines 123,124; and line 125, valve 126 and line 127, respectively.

Additional hydrogen cyanide, as well as other gases and inorganic materials in the synthesis gas, may dissolve in the water during the gas scrubbing step. The mixture of synthesis gas and grey water from venturi type scrubber 19 is directed through line 92 into a pool of grey water 93 located in the bottom of gas scrubber and separator vessel 20. Additional condensate for the scrubbing operation is introduced into separator vessel 20 through line 86. In gas scrubber and separator vessel 20, a final cleaning of the synthesis gas takes place and the synthesis gas and the grey water are separated from each other. The synthesis gas is removed from the top of separator vessel 20 through line 95. The grey water is passed through bottom line 97 to pump 98 from which it is sent to the venturi type scrubber 19 and quench chamber 11 by way of lines 99, 100, valve 101, and line 102; and line 103, valve 104, lines 105 and 124, respectively. Optionally, a portion of the grey water in line 99 may be passed through line 110, valve 111, and line 112 into line 21.

The overhead gas stream from separator vessel 20 and line 95, which is now substantially free of entrained particulates, may be used as synthesis gas where the ratio of $H_2$ to CO in the raw effluent synthesis gas as produced is satisfactory. For example, with valve 103 in line 104 closed and valve 105 in line 106 open, this synthesis gas stream is passed through lines 95, 106, 107, and is cooled in gas cooler 113 to the dew point temperature, or below. For example, the gas in line 115 may be at a temperature in the range of about ambient to 65° C. The mixture of condensate and synthesis gas is passed through line 115 into gas-liquid separator 116. The condensate formed in the cooling step is removed in separator 116 and recycled by way of line 86 to scrubber-separator 20 for use in scrubbing the synthesis gas. The resulting cooled and scrubbed synthesis gas in line 114 can then be further processed, for example purified by conventional methods to remove sulfur-containing gases and used for synthesis of organic chemicals or as a reducing or fuel gas. The compositions of synthesis gas, reducing gas, and fuel gas are related and contain $H_2$ and CO. The mole ratio $H_2/CO$ for synthesis gas is controlled for the synthesis of organic chemicals. Reducing gas is rich in $H_2$ and/or CO and is used for chemical reduction. Fuel gas may also contain $CH_4$ and is burned as a fuel. Alternatively, with valve 105 closed and valve 103 open, the overhead gas stream from separator vessel 20 and line 95 may be passed through lines 104 and 108 and may be used for chemicals production after adjustment of the $H_2$ to CO ratio.

Although modifications and variations of the invention may be made without departing from the spirit and scope thereof, only such limitations should be imposed as are indicated in the appended claims.

We claim:

1. A process for the partial oxidation of a liquid hydrocarbonaceous fuel or an aqueous slurry of solid carbonaceous fuel comprising:
   (1) reacting by partial oxidation a liquid hydrocarbonaceous fuel or an aqueous slurry of solid carbonaceous fuel with a free-oxygen containing gas in the presence of a temperature moderator to produce a hot raw gas stream comprising $H_2$, CO, $CO_2$, $H_2O$; entrained particulate matter comprising particulate carbon and ash; and at least one material selected from the group consisting of $N_2$, Ar, $H_2S$, COS, $CH_4$, $NH_3$, HCN, HCOOH, and slag;
   (2) cooling the hot raw gas stream from (1) by (a) direct contact with quench water in a gas quenching zone thereby producing a pumpable stream of black quench water, or by (b) indirect heat exchange with water in a gas cooling zone;
   (3) scrubbing in a gas scrubbing zone the cooled hot raw gas stream from (2) with a deaerated grey water to remove substantially all of the remaining entrained particulate matter in said raw gas stream, and producing black scrubbing water;
   (4) introducing said black quench water from (2) (a) and said black scrubbing water from (3) into a flash zone wherein the pressure is dropped by flashing thereby producing flash vapor comprising vaporized grey water and a sour gas; and a separate bottoms stream of flashed black water whose solids content is greater than the solids content of said black scrubbing water in (3);
   (5) passing a first portion of said flash vapor from (4) through a heat exchange zone in indirect heat exchange with a stream of deaerated grey water, thereby simultaneously heating said deaerated gray water and condensing grey water from the cooled flash vapor, and separating sour gas from said condensed grey water;

(6) introducing a second portion of said flash vapor from (4) and said condensed grey water from (5) into a deaerating zone, deaerating said condensed grey water, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b);

(7) clarifying the flashed black water from (4) in a clarifying zone to produce grey water and a bottoms stream of concentrated black water;

(8) filtering the stream of concentrated black water from (7) to produce filter cake and grey water filtrate; and (9) deaerating the grey water produced in (7) and (8) in said deaerating zone, and recycling by way of said heat exchange zone in (5) at least a portion of the deaerated grey water to said gas quenching zone in (2)(a) and the gas scrubbing zone in (3) for the gas quenching mode in (2)(a) or to the gas scrubbing zone in (3) for the gas cooling mode in (2)(b).

2. The process of claim 1 where in (1) said partial oxidation reaction takes place at a temperature in the range of about 925° C. to 1926° C., a pressure in the range of about 5 to 300 atmospheres, a weight ratio of steam to fuel in the range of about 0.1 to 5.0, and an atomic ratio of free-oxygen to carbon in the feed in the range of about 0.8 to 1.4.

3. The process of claim 1 wherein the black quench water in (2)(a) has a solids content of about 0.1 to 4.0 wt. %.

4. The process of claim 1 wherein said gas cooling zone in (2)(b) comprises a radiant and/or convective cooler.

5. The process of claim 1 wherein said gas scrubbing zone in (3) comprises an orifice or venturi scrubber followed by a gas-liquid scrubbing column.

6. The process of claim 1 wherein the condensed grey water is deaerated in (6) at a temperature in the range of about 100° C. to 150° C. and a pressure in the range of about 100 to 400 kPa by stripping.

7. The process of claim 1 wherein the sour gas in (4) is selected from the group consisting of $CO_2$, $NH_3$, CO, $H_2S$, HCN, COS, HCOOH, and mixtures thereof.

8. A process for the partial oxidation of a liquid hydrocarbonaceous fuel or an aqueous slurry of solid carbonaceous fuel comprising:

(1) reacting by partial oxidation of a liquid hydrocarbonaceous fuel or an aqueous slurry of solid carbonaceous fuel with a free-oxygen containing gas in the presence of a temperature moderator to produce a hot raw gas stream comprising $H_2$, CO, $CO_2$, $H_2O$, entrained particulate matter comprising particulate carbon and ash; and at least one material selected from the group consisting of $N_2$, Ar, $H_2S$, COS, $CH_4$, $NH_3$, HCN, HCOOH, and slag;

(2) cooling the hot raw gas stream from (1) by (a) direct contact with quench water in a gas quenching zone thereby producing a pumpable stream of black quench water, or by (b) indirect heat exchange with water in a gas cooling zone;

(3) scrubbing in a gas scrubbing zone the cooled hot raw gas stream from (2) with a deaerated grey water to remove substantially all of the remaining entrained particulate matter in said raw gas stream and producing black scrubbing water;

(4) introducing said black quench water from (2)(a) and said black scrubbing water from (3) into the first flash stage of a flash zone comprising first and second flash stages wherein the pressure in said first flash stage is dropped by flashing from an inlet pressure in the range of about 1500 to 18,000 kPa to an outlet pressure in the range of about 300 to 2000 kPa, thereby producing a stream of flash vapor comprising vaporized grey water and a sour gas; and a separate bottoms stream of flashed black water whose solids content is greater than the solids content of said black scrubbing water in (3);

(5) passing the stream of flash vapor from (4) through a heat exchange zone in indirect heat exchange with a stream of deaerated grey water, thereby simultaneously heating said deaerated grey water and condensing grey water from the cooled flash vapor;

(6) separating sour gas from the condensed grey water produced in (5), deaerating said condensed grey water in a deaerating zone, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b);

(7) introducing the bottoms stream of flashed black water from (4) into said second flash stage wherein the pressure is dropped by flashing from an inlet pressure in the range of about 300 to 2000 kPa to an outlet pressure in the range of about 100 to 1950 kPa, thereby producing a stream of flash vapor comprising vaporized grey water and sour gas, and a separate bottoms stream of flashed black water whose solids content is greater than the solids content of said bottoms stream of black water from (4);

(8) introducing said stream of flash vapor from (7) with or without supplemental steam into said deaerating zone;

(9) clarifying the flashed black water from (7) in a clarifying means to produce grey water and a bottoms stream of concentrated black water;

(10) filtering the stream of concentrated black water from (9) to produce filter cake and grey water filtrate; and

(11) deaerating the grey water produced in (9) and (10) in said deaerating zone, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b) .

9. A process for the partial oxidation of a liquid hydrocarbonaceous fuel or an aqueous slurry of solid carbonaceous fuel comprising:

(1) reacting by partial oxidation a liquid hydrocarbonaceous fuel or an aqueous slurry of solid carbonaceous fuel with a free-oxygen containing gas in the presence of a temperature moderator to produce a hot raw gas stream comprising $H_2$, CO, $CO_2$, $H_2O$, entrained particulate matter comprising particulate carbon and ash; and at least one material selected from the group consisting of $N_2$, Ar, $H_2S$, COS, $CH_4$, $NH_3$, HCN, HCOOH, and slag;

(2) cooling the hot raw gas stream from (1) by (a) direct contact with quench water in a gas quenching zone thereby producing a pumpable stream of black quench water, or by (b) indirect heat exchange with water in a gas cooling zone;

(3) scrubbing in a gas scrubbing zone the cooled hot raw gas stream from (2) with a deaerated grey water to remove substantially all of the remaining entrained particulate matter in said raw gas stream, and producing black scrubbing water;

(4) introducing said black quench water from (2)(a) and said black scrubbing water from (3) into the first flash stage of a flash zone comprising three flash stages connected in series wherein the pressure in said first flash stage is dropped by flashing from an inlet pressure in the range of about 1500 to 18,000 kPa to an outlet pressure in the range of about 300 to 2000 kPa, thereby producing a stream of flash vapor comprising vaporized grey water and a sour gas; and a separate bottoms stream of flashed black water whose solids content is greater than the solids content of said black scrubbing water in (3);

(5) passing the stream of flash vapor from (4) through a heat exchange zone in indirect heat exchange with a stream of deaerated grey water and condensing grey water from the cooled flash vapor;

(6) separating sour gas from the condensed grey water produced in (5), deaerating said condensed grey water in a deaerating zone, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b);

(7) introducing the bottoms stream of flashed black water from (4) into the second flash stage wherein the pressure is dropped by flashing from an inlet pressure in the range of about 300 to 2000 kPa to an outlet pressure in the range of about 100 to 1950 kPa, thereby producing a stream of flash vapor comprising vaporized grey water and sour gas, and a separate bottoms stream of flashed black water whose solids content is greater than the solids content of said bottoms stream of black water from (4);

(8) introducing said stream of flash vapor from (7) with or without supplemental steam into said deaerating zone;

(9) introducing said bottoms stream of flashed black water from said second flash stage in (7) into the third flash stage wherein the pressure is dropped by flashing from an inlet pressure in the range of about 100 to 1950 kPa to an outlet pressure in the range of about 95 to 5.0 kPa, thereby producing a stream of flash vapor comprising vaporized grey water and sour gas, and a bottoms stream of flashed black water whose solids content is greater than the solids content of said bottoms stream of black water from (7);

(10) cooling said flash vapor from (9) and condensing grey water, and introducing said condensed grey water into said deaerating zone;

(11) clarifying the flashed black water from said third flash stage in (9) in a clarifying means to produce grey water and a bottoms stream of concentrated black water;

(12) filtering the stream of concentrated black water from (11) to produce filter cake and grey water filtrate; and

(13) deaerating the grey water produced in (10), (11) and (12) in said deaerating zone, and recycling by way of said heat exchange zone in (5) at least a portion of the deaerated grey water to the gas quenching zone in (2)(a) and the gas scrubbing zone in (3) for the gas quenching mode in (2)(a) or to the gas scrubbing zone in (3) for the gas cooling mode in (2)(b).

* * * * *